July 20, 1971  O. B. NOREN  3,594,285

MACHINE FOR INJECTING INFLUENZA SEED VIRUS INTO EGGS

Filed Dec. 29, 1966  6 Sheets-Sheet 1

INVENTOR
OSCAR B. NOREN

BY Barnes, Kisselle, Raisch & Choate

ATTORNEYS

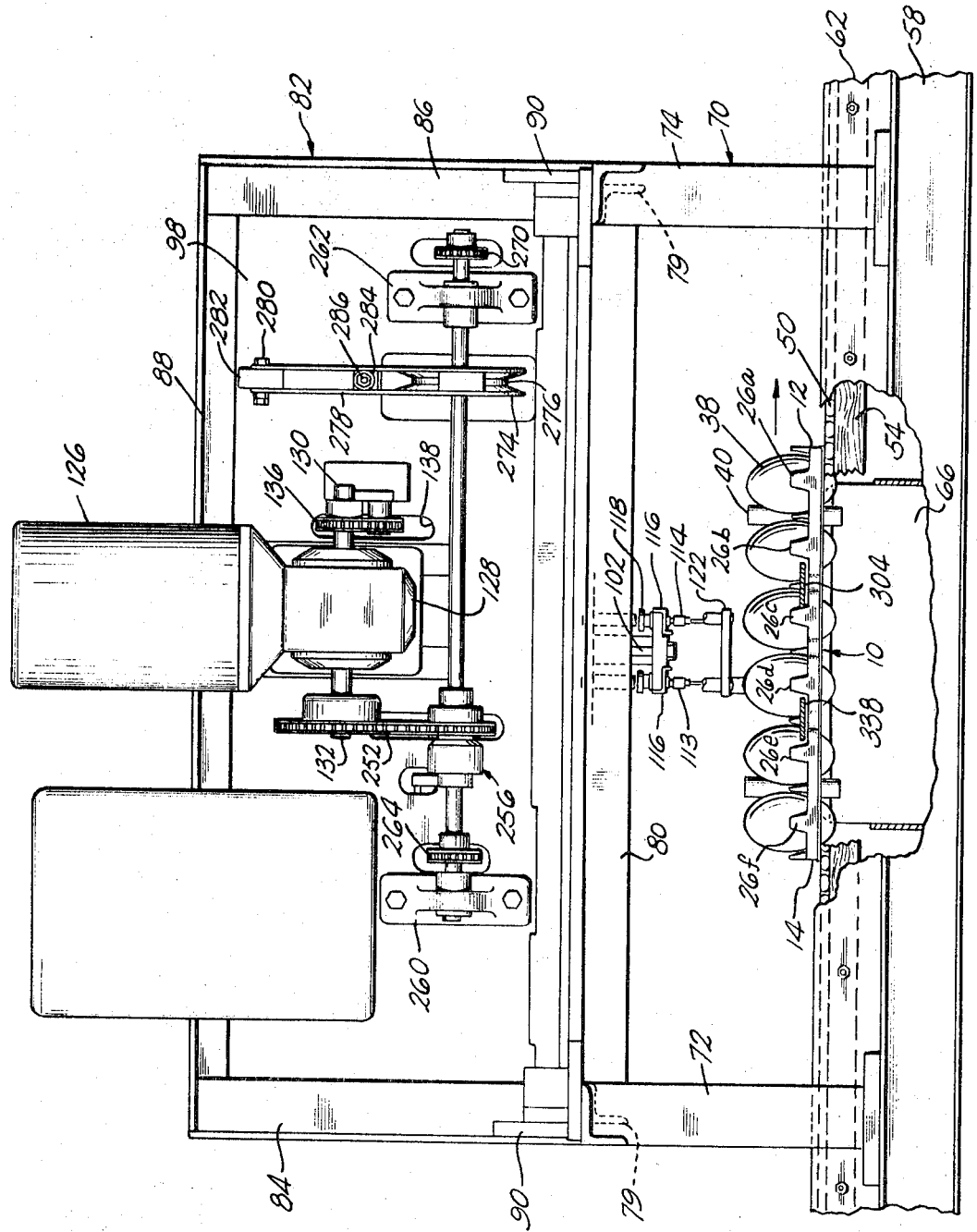

July 20, 1971          O. B. NOREN          3,594,285

MACHINE FOR INJECTING INFLUENZA SEED VIRUS INTO EGGS

Filed Dec. 29, 1966          6 Sheets-Sheet 3

*INVENTOR*
OSCAR B. NOREN

*ATTORNEYS*

INVENTOR
OSCAR B. NOREN

BY Barnes, Kinsella, Raisch & Choate
ATTORNEYS

INVENTOR
OSCAR B. NOREN

BY Barnes, Kisselle, Raisch & Choate
ATTORNEYS

United States Patent Office 3,594,285
Patented July 20, 1971

3,594,285
MACHINE FOR INJECTING INFLUENZA SEED VIRUS INTO EGGS
Oscar B. Noren, Grosse Pointe Farms, Mich., assignor to Parke, Davis & Company, Detroit, Mich.
Filed Dec. 29, 1966, Ser. No. 605,632
Int. Cl. C12k 1/10
U.S. Cl. 195—127                 18 Claims

ABSTRACT OF THE DISCLOSURE

Apparatus for automatically transporting, locating and fixturing one or more eggs or the like while the same are arranged in a predetermined array on a flat egg tray or similar support, and for performing an operation on the egg or other supported object while so fixtured. In particular, the machine automatically cycles to lower an array of hollow piercing needles corresponding in number to the fixtured eggs so that the needles pierce the imperforate upper surface of the large end of the eggshell. A liquid containing influenza seed virus is supplied to the needles by a pump which is synchronized to meter a given quantity of liquid to the needle such that this amount of liquid is injected into the egg when the needle is approximately bottomed in its egg piercing and penetrating stroke. The needle is then withdrawn, the tray advanced and the cycle repeated.

---

This invention relates to the manufacture of biologicals and more particularly to a machine for injecting seed virus entrained in a liquid carrier into eggs in which the virus is propagated for subsequent harvesting and processing into vaccine or other viral products.

Influenza virus vaccine production has hitherto been performed manually under government standards which specify incubation of hen's eggs for eleven days, candling inspection of the eggs after the eleven-day incubation, inoculation of the egg with influenza seed virus, incubation for another two days to propagate the virus within the egg, candling inspection of the inoculated eggs, an overnight chill followed by cutting open the eggs and withdrawing the infected liquid from the egg for centrifuging and further processing into influenza virus vaccine.

An object of the present invention is to provide apparatus for mechanizing and automating the egg inoculation phase of influenza virus production to thereby increase production capacity and reduce the cost of vaccine production.

Other objects as well as features and advantages of the present invention will become apparent from the following detailed description taken in conjunction with the accompanying drawings wherein:

FIG. 1 is a fragmentary end elevational view of a machine for injecting seed virus liquid into hen's eggs in accordance with the present invention, portions being broken away to better illustrate detail.

FIG. 2 is a rear elevational view of the machine of FIG. 1, with portions broken away to illustrate detail.

FIG. 3 is a top plan view of the machine of FIGS. 1 and 2.

FIG. 4 is a fragmentary horizontal plan view taken on the line 4—4 of FIG. 1 illustrating a portion of an egg rack, conveyor and associated tray locating and sensing mechanism employed in the machine.

FIG. 5 is a fragmentary perspective view illustrating one corner of the egg rack of FIGS. 1, 2 and 4 which may be used in conjunction with the egg inoculating equipment of the invention.

Figure 6:
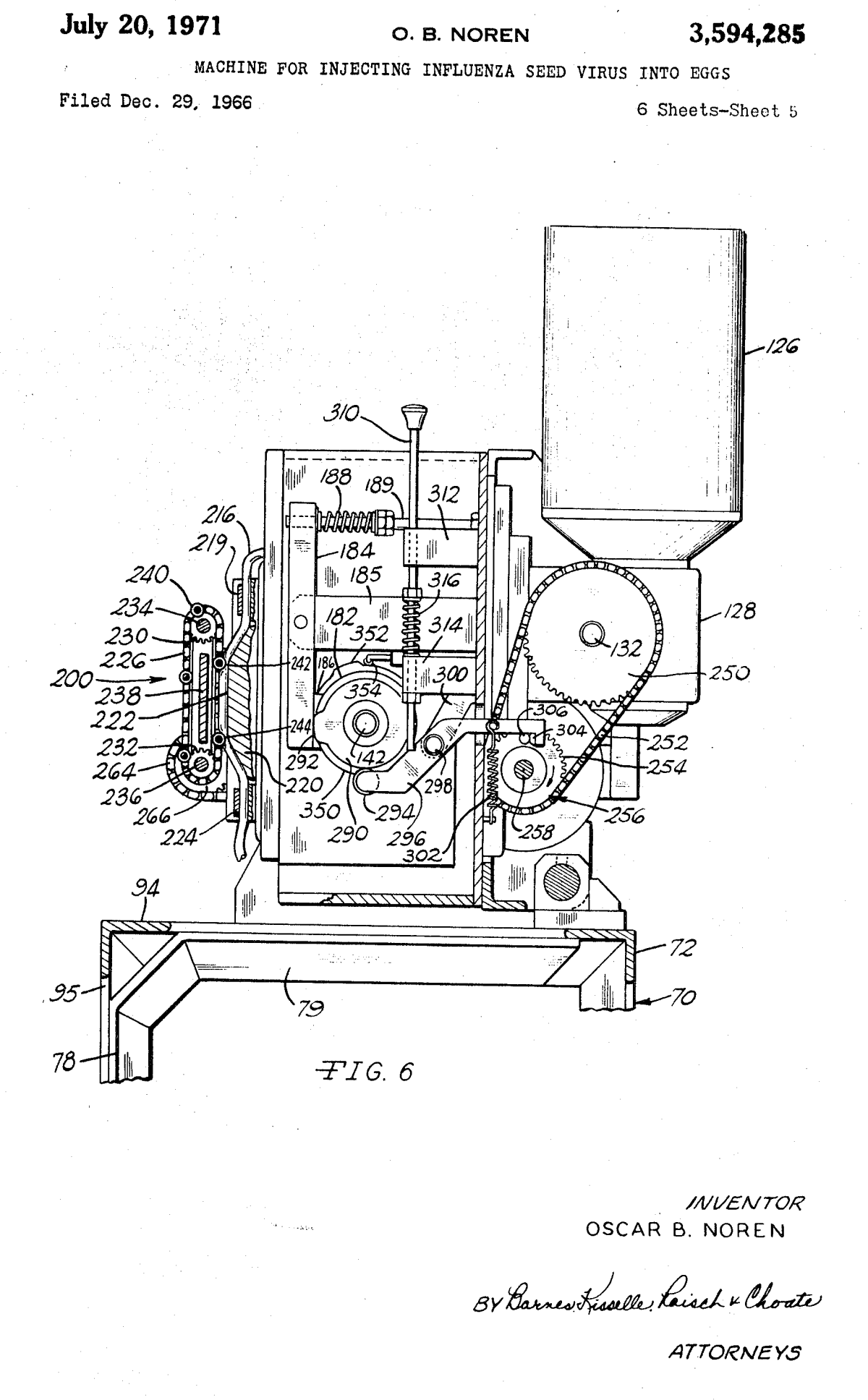

FIGS. 6, 7 and 8 are vertical sectional views taken on the lines 6—6, 7—7 and 8—8 respectively of FIG. 3, with portions broken away to illustrate details.

FIG. 9 is a fragmentary side elevational view of the rack sensing mechanism.

EGG TRAY

Referring in more detail to FIGS. 1, 2, 4 and 5, the mechanism of the present invention is adapted to transport, locate and fixture a plurality of hen's eggs 38 while the same are arranged in a predetermined fashion on an egg flat or tray 10 so that the eggs are inoculated with the influenza seed virus without any manual handling of the eggs. Although the tray for supporting the eggs may take various forms, a commercially available tray 10 made by James Manufacturing Company of Fort Atkinson, Wis., is preferred, the same being accurately injection molded of plastic material to a square shape in plan configuration and adapted to support thirty-six hen's eggs 38 arranged upright in six parallel rows with six eggs in each row. Tray 10 has parallel front and rear walls 12 and 14, parallel side walls 16 and 18, five lengthwise partitions 20 parallel to the side walls and five transverse partitions 22 parallel to the end walls to thereby subdivide tray 10 into thirty-six equal size square compartments. Each compartment is also bounded by four fingers 24, 26, 28 and 30 extending upright from the boundary walls of the compartment at 90° intervals around the center of the compartment to form lateral supports for maintaining an egg upright in each compartment. The compartments are completely open at the top and partially open at the bottom, the bottom wall of each compartment comprising (FIG. 4) four tabs 32 extending horizontally inwardly from the lower edge of the compartment side walls, the space between each adjacent pair of tabs being cut away in a circular configuration as at 34. Tabs 32 are somewhat flexible and are spaced from one another to engage the side of an egg 38 so as to support the same with the pointed or narrow end 39 of the egg projecting downwardly below the bottom wall of tray 10. Tray 10 is provided with four vertical posts 40 at the inner corner of each corner compartment which extend beyond the upper and lower ends of the eggs to permit the trays to be stacked one on top of another or be placed on a flat surface with a clearance for the eggs. The six fingers 26a, 26b, 26c, 26d, 26e and 26f along each side edge of the tray 10 are equally spaced from one another and each of these fingers bears the same orientation to the adjacent egg compartment.

CONVEYOR MECHANISM

Referring to FIGS. 1, 2 and 3, the egg injecting machine of the present invention includes a conveyor mechanism for supporting and transporting tray 10 along a horizontal path through the machine. A pair of endless roller chains, driven continuously by a suitable sprocket drive (not shown), are spaced laterally apart parallel to one another with their upper runs 50 and 52 (FIG. 1) running respectively along the upper surfaces of rails 54 and 56 fixed to laterally spaced parallel side channels 58 and 60 mounted on a suitable supporting framework (not shown). Angle irons 62 and 64 are mounted respectively on channels 58 and 60, the upright flanges thereof being disposed against rails 54 and 56 respectively and projecting above runs 50 and 52 to form parallel side guides for the runs and for closely but slidably receiving the side edges of tray 10 therebetween to guide movement of the tray. Tray 10 rests along its side edges loosely on runs 50 and 52 and is frictionally propelled thereby in the direction of the arrow in FIG. 2. Tray 10 when it reaches the centrally located work station (FIG. 2) is additionally supported beneath its middle lengthwise partition 20c by a center rail 65 mounted along the upper edge of a plate 66 secured to a horizontal brace 67.

FRAMEWORK

The needle carrier and actuating mechanism as well as the pumping mechanism of the machine of the invention are supported above the bed of the conveyor on a frame 82 pivotally mounted at the rear thereof on a stand 70 (FIG. 2) having rear legs 72 and 74 supported on channel 58 and front legs 76 and 78 (FIGS. 1 and 6) mounted on channel 60. The front and rear legs are at their upper ends connected to transverse struts 79, and the upper ends of the rear legs 72, 74 are connected to a longitudinal brace 80. Frame 82 comprises a pair of upright side posts 84 and 86 (FIG. 2) connected at their upper ends to a longitudinal brace 88 and hinged at their lower ends on stand 70 by a pair of hinge assemblies 90 for pivotal movement about the coincident horizontal axes of hinge pins 92. Uprights 84 and 86 carry a back plate 98 on which the various components of the machine are mounted. Frame 82 is braced by gussets 93 and rests on members 79. Legs 94 have vertical feet 95 (FIG. 1) adapted for engagement with a locking screw 96 to lock frame 82 in the operative position shown in FIGS. 1, 2 and 3. Frame 82 thus may be unlocked and pivoted upwardly and rearwardly to facilitate cleaning and set up.

EGG PENETRATING MECHANISM

The egg injecting machine of the present invention includes a vertically reciprocable needle carrier subassembly (FIGS. 1, 2 and 7) which includes a horizontal plate 100 having an upright center rib 102 secured to a block 104 which in turn is secured to the lower ends of a pair of vertical shafts 106 and 108 of an anti-friction cam slide unit 110. Although a pneumatic cylinder and piston arrangement may be used for raising and lowering carrier 100, in the disclosed embodiment a commercially available cam drive 110 is employed such as the Model CS-4 Cam Slide manufactured by Stelron Cam Company of Paramus, N.J. Twelve commercially available hypodermic needles 112 are removably mounted on plate 100 with needles arranged in two rows 113 and 114 (FIG. 2), one row on each side of rib 102 with six needles in each row. Each needle 112 is received in a notch formed in the edge of plate 100 and is removably locked therein by a notched plate 116 (FIG. 2) secured by thumb screws 118 at the ends of plate 100. Needles 112 are mounted with their stainless steel penetrating ends 120 pointing vertically downwardly, the needles being oriented for vertical alignment with the longitudinal axes of the subjacent eggs 38 disposed in any two transverse adjacent rows of eggs in tray 10. Preferably ends 120 of needles 112 are 17 gauge (.058") or larger.

In the raised position of needles 112 as shown in FIGS. 1, 2 and 7, ends 120 are spaced about ¾" above eggs 38, and at their lowermost position ends 120 penetrate the eggs for a distance of about ¾" below the upper ends of eggs 38. Hence the aforementioned cam slide unit 110 (FIG. 7) or equivalent drive mechanism should be capable of imparting a vertical stroke of greater than ¾", herein shown by way of example as about 1½", and should produce an acceleration on the downstroke such that the velocity of the needles reaches about 1 ft./second when ends 120 strike the shells of the eggs. Successful results have been obtained operating with a contact velocity of 1.25 ft./second, and higher speeds can be employed within the capability of the drive mechanism. However, the slowest contact speed successfully employed was about .83 ft./second, and penetrating speeds much slower than this do not provide optimum results. In addition, it has been found desirable to cause the needles to pause at the lower limit of their stroke, and during this pause to pump the liquid containing the influenza seed virus via the needle into the egg. The return upstroke is less critical and greater latitude of needle velocity is possible. However, it has been found desirable to provide a fixed stripper plate 122 directly above the two rows of eggs being injected, plate 122 having holes 124 individually aligned with needles 112 through which the needles pass on the downstroke and into which the needles are retracted on the upstroke. Plate 122 serves to strip from the needles any eggs 38 which may tend to cling to the needles as the same are withdrawn from the egg on the upstroke.

The drive mechanism for the needles includes a source of power such as an electric motor 126 (FIGS. 1, 2, 3, 6, 7 and 8) mounted on the rear face of backboard 98 and having a gear reduction drive 128 provided with twin output shafts 130 and 132 which project from opposite sides of reduction drive unit 128. A sprocket 133 (FIG. 8) is fixed on shaft 130 and is coupled to a sprocket 134 by a chain 136 which extends through an opening 138 in board 98. Sprocket 134 is attached to the input side of a commercially available single-revolution clutch 140 which is mounted on one end of a horizontal shaft 142 which extends through cam slide unit 110. One example of such a clutch is Model No. 2–1–6L made by the Hilliard Corporation of Elmira, N.Y. Sprocket 134 and the input side of clutch 140 are continuously rotated by motor 126 and rotate freely relative to shaft 142. Clutch 140 is adapted to constantly apply torque in the direction of the arrow in FIG. 8 from sprocket 134 to a trip plate 144 (FIGS. 3 and 8) fixed to shaft 142.

Plate 144 has a radial stop shoulder 146 extending between the outer and inner ends 148 and 150 of a spiral peripheral surface of the plate. A pawl 152 is pivotally mounted at 154 and is biased into tracking relation with the periphery of plate 144 by a tension spring 156 so that the lower end of pawl 152 normally abuts shoulder 146 to hold shaft 142 fixed against rotation at a predetermined angular position. The upper end of pawl 152 is pivotally connected to a link 158 which in turn is connected to the armature of a solenoid 160 which, when energized as described subsequently herein, pulls the upper end of the pawl 152 toward the solenoid to thereby swing the lower end of the pawl out of engagement with shoulder 146 to release plate 144. As soon as clutch 140 is thus tripped for rotation, solenoid 160 is deenergized so that spring 156 is effective to maintain the pawl in sliding contact with the periphery of plate 144. Hence when plate 144 completes one revolution, shoulder 146 strikes the lower end of pawl 152 to stop rotation of the plate.

Cam slide unit 110 has a pair of cams 162 and 164 (FIG. 7) fixed to shaft 142 on opposite sides of a block 166 mounted on shafts 106 and 108. Cam 162 engages a cam follower roller 168 connected to the upper end of block 166, and cam 164 engages a cam follower roller 170 connected to the lower end of block 166. Shafts 106 and 108 are guided for vertical movement by axially spaced bearing assemblies 172 and 174 disposed in frame 175 of unit 110, and cams 162 and 164 are suitably contoured to respectively positively drive block 166 up and down through the aforementioned vertical stroke, with suitable dwell portions to effect a pause at each end of the stroke.

Preferably the end of shaft 142 which projects from the side of unit 110 remote from clutch 140 (the left side as viewed in FIG. 3) is provided with a Prony brake unit 180 which exerts a constant frictional drag on shaft 142. Unit 180 (FIGS. 3 and 6) includes a V-belt type pulley 182 fixed to shaft 142 and a pair of plates 184 pivoted on an arm 185 which carry a friction member 186 between their lower ends which is urged into frictional rubbing engagement with pulley 182 by a compression spring 188 mounted on a fixed shaft 189 extending through the upper ends of plates 184.

LIQUID SUPPLY MEANS

The mechanism for supplying liquid to the needles comprises two pumping units 200 and 202 (FIG. 3), one for each row 113 and 114 of the needles. Preferably, pumping units 200 and 202 comprise commercially available peristaltic type proportioning pumps, such as those made by Technicon Instruments Corporation of Chauncey, N.Y., which are modified in accordance with the invention as described hereinafter for intermittent synchronized pumping action to simultaneously pump a predetermined quantity of liquid to each needle 112 during the pause of the needle at the bottom of its vertical stroke. A pair of hoses 204 and 206 (FIGS. 1 and 3) are connected to a source of supply of the injection liquid (not shown) and respectively feed the liquid to manifolds 208 and 210 mounted by brackets 212 and 214 to backboard 98 and arranged one on each side of the needle carrier and drive mechanism. A series of six flexible tubes 216 are connected at their upper ends to manifold 208 (FIG. 1) and extend downwardly over the front face of a housing 218 of the pump unit, through an upper clamp 219 (FIG. 6) and thence over a back-up platform 220 formed with a flat central portion 222 and inclined ramps at either end thereof and thence through a lower clamp 224, the tubes being held taut over platform 220 and parallel with one another by clamps 219 and 224. The lower ends of the tubes 216 are individually connected to the upper ends of the hypodermic needles in row 112, and sufficient slack is provided between the lower clamp 224 and the needles so that the tubes can flex to accommodate vertical travel of the needles. A series of six tubes 217 (FIGS. 1 and 3) are likewise arranged in pump unit 202, the structure of this unit being the same as unit 200 and hence not further described herein.

Pump 200 includes a pair of spaced endless chains 226 and 228 (FIGS. 3 and 6) trained around vertically spaced sprockets 230 and 232 fixed respectively on an idler shaft 234 and a drive shaft 236, these shafts being journaled on a spider framework 238 which is hinged to support 218 by a hinge assembly 239 (FIG. 1), but which in operative position is rigidly locked to support 218 with the axes of shafts 234 and 236 parallel to surface 222 of platform 220. Chains 226 and 228 carry a plurality of freely rotatable rollers 240 extending perpendicularly therebetween (five such rollers being shown) which are spaced equally from one another lengthwise of the chain by a distance equal to or slightly less than the length of platform 222. Tubes 216 are squeezed by each roller as it traverses platform 222 to thereby pinch each tube shut in the portion compressed between the roller and platform 222. Drive shaft 236 is rotated by a drive mechanism described subsequently herein to index the chains a distance sufficient to advance the upper engaged roller 242 downwardly to the position of the lower roller 244, thereby advancing a column of fluid within the tube by the same distance, thus pumping a metered quantity of the liquid to the needles when the same have paused at the bottom of their stroke. Preferably the pump is synchronized so that a pair of rollers simultaneously engage the tube 216 when the pump is at rest, as shown in FIG. 6. Thus, as roller 242 reaches the position previously occupied by roller 244 in FIG. 6, the successive roller 240 comes into engagement with tube 216 at the position previously occupied by roller 242 in FIG. 6, thereby pinching the tube at two spaced points and trapping the fluid therebetween. It is to be understood that the pump index cycle may encompass two or more such traversals of the rollers along the tubes if a greater metered quantity of liquid is to be pumped.

The drive mechanism for pumps 200 and 202 includes a sprocket 250 (FIG. 6) fixed to shaft 132 which is continuously driven by motor 126 and coupled via an endless chain 252 to a sprocket 254 of a single revolution clutch unit 256 (FIGS. 2 and 3), similar to clutch unit 140, which is supported on a countershaft 258 (FIGS. 2 and 3) journaled in bearing brackets 260 and 262 secured to the rear side of backboard 98. An endless chain 264 is trained around a sprocket 266 (FIG. 6) fixed to shaft 236 and around a sprocket 268 (FIG. 3) fixed to shaft 258 to drivingly couple countershaft 258 to shaft 236. A similar driving chain 270 (FIG. 3) couples pump 202 to countershaft 258.

A Prony brake mechanism 272 (FIGS. 2 and 3) is mounted on backboard 98 to exert a frictional drag on countershaft 258 and is similar to Prony brake 180. Mechanism 272 includes a pulley 274 fixed to shaft 258 and a friction member 276 carried at the lower end of a pair of plates 278 pivoted at 280 on a support 282 and biased toward the pulley by a spring 284 mounted on a rod 286 extending between the arms and fixed at one end to the backboard.

Pumps 200 and 202 are synchronized with the operation of the needle drive mechanism by a cam actuating device associated with the single revolution clutch 256, as best seen in FIG. 6. Shaft 142 has a cam 290 secured thereto the periphery of which has a base circle and cam lobe 292 tracked by a roller follower 294 journaled on one end of a bell crank 296 which is pivoted at 298 on a support arm 300. A tension spring 302 is connected between backboard 98 and the other arm of crank 296 to bias roller 294 into tracking engagement with the periphery of cam 290. A stop 304 is fixed to the L-shaped free end of crank 296, stop 304 being disposed in the path of travel of a pin 306 secured to the output side of clutch 256 when follower 294 is tracking on the base circle of cam 290. When shaft 142 is rotated through one revolution as previously described, lobe 292 engages follower 294 as the needles reach the bottom of their stroke, thereby pivoting crank 296 counterclockwise as viewed in FIG. 6 to lift stop 304 clear of pin 306. This allows the output side of clutch 256 to rotate counter shaft 258 in the direction of the arrow in FIG. 6. When lobe 292 has passed follower 294, the follower is returned to the base circle of the cam by spring 302, thereby pivoting crank 296 clockwise and returning stop 304 into blocking relation to pin 306 so that the same is caught at the completion of one revolution of countershaft 258. In this manner pumps 200 and 202 are driven simultaneously and the pump rollers are indexed through one stroke as described previously so that fluid is pumped from the source via tubes 216 to each of the needles during the pause of the needles at the bottom of their injection stroke.

If desired, a manually actuated priming control may be provided consisting of a shaft 310 (FIG. 6) mounted for vertical movement in brackets 312 and 314 and engageable at its lower end with a notch in crank 296. Shaft 310 is biased upwardly by a spring 316 which maintains the shaft in the position shown in FIG. 6 wherein it does not interfere with movement of crank 296. However when it is desired to prime tubes 216, 217, pumps 200 and 202 may be operated independently of the needle drive mechanism by pushing shaft 310 downwardly to hold crank 296 disengaged from cam 290, thereby allowing clutch 256 to couple the electric drive to shaft 258 to drive the pumps as long as the shaft is held depressed.

EGG TRAY POSITIONING MECHANISM

The mechanism for fixturing the eggs at the work station of the egg injecting machine of the present invention includes a pair of substantially identical stop mechanisms 300 and 302 (FIGS. 1 and 4) mounted respectively on guides 62 and 64. Stop mechanisms 300 and 302 each include a Z-shaped plate 303 (FIG. 1) comprising an upper arm 304, a center portion 306 and a lower arm 308. Arm 304' of mechanism 302 differs from arm 304 of mechanism 300 only in having its trailing edge 330' reversed from that of arm 304. A hinge pin 310 extends through a bushing secured to portions 306 and 308 and is journaled in a pair of upright ears 312 mounted on guide 62 to thereby pivotally support the stop member 303 for rotation about a horizontal axis between the tray blocking position shown in FIG. 1 wherein arm 304 intersects the path of travel of tray fingers 26 and a retracted position wherein portion 304 swings up and back, clear of the path of travel of the fingers. A coil spring 314 disposed between arm 308 and guide 62 biases stop member 303 toward tray blocking position shown in FIG. 1. A screw 316 threaded through portion 306 bears against the upright flange of guide 62 to permit adjustment of this position. A bracket 318 is mounted on guide 62 and supports a solenoid 320, the armature of which is connected by a link 322 to one end of a lever 324 pivoted at 326 for rotation about a horizontal axis and bearing at its other end against the upper surface of arm 308 of stop 303. When solenoid 320 is energized as described hereinafter, the armature is drawn upwardly, thereby pivoting lever 324 clockwise as viewed in FIG. 1 so that its free end pushes downwardly on arm 308 to thereby pivot stop 303 counterclockwise to its release position. Stop mechanism 302 operates in a like manner and is connected in parallel with mechanism 300 to operate simultaneously therewith.

As best seen in FIG. 4, the leading edge 328 of arm 304 extends perpendicularly to the direction of travel of tray 10 and is adapted to engage the leading edge of the adjacent side fingers 26 of tray 10 to block movement of the tray on the conveyor. The trailing edge 330 of arm 304 is tapered in outwardly converging relation with edge 328 to facilitate insertion of the arm between adjacent fingers 26 when the same is pivoted by spring 314 from its released to its blocking position. Preferably arm 304 is slightly shorter (about ⅛") along dimension A thereof shown in FIG. 4 than the spacing between adjacent side fingers 26.

CYCLE CONTROL MECHANISM

The mechanism for sensing the position of tray 10 and initiating an egg inoculation cycle includes a sensing mechanism 332 (FIGS. 4 and 9) which is located a predetermined distance in advance of stop mechanism 300 relative to the direction of travel of tray 10 (indicated by the arrows in FIG. 4). Sensing mechanism 332 has a Z-haped sensor 334, similar to stop member 303, pivoted on a pin 336 so that its upper horizontal arm 338 is movable from a horizontal position in the path of fingers 26 (FIGS. 2 and 9) upwardly and outwardly in a counterclockwise direction as viewed in FIG. 9 to permit fingers 26 to move past arm 338. Sensor 334 also carries an adjustment screw 340, similar to screw 316. A compression coil spring 342 (FIG. 9) is disposed between arm 344 and the horizontal flange of guide 62 to bias sensor 334 to the FIG. 9 position. A microswitch 346 is mounted on a bracket 348 secured to guide 62. A switch finger 350 of the microswitch is positioned below the end of arm 344 so as to be actuated by arm 344 when sensor 334 is pivoted counterclockwise in response to a side finger 26 of tray 10 striking the leading edge 352 of arm 338, which is tapered in outwardly converging relation with its straight trailing edge 353, during advancing movement of tray 10 and then camming sensor 334 up until it slides along the side of finger 26 as the finger moves past the sensor arm 338. Sensing mechanism 332 is connected by suitable electrical circuitry (not shown) to control the operation of the solenoids 320 of the stop mechanisms 300 and 302 as well as to control the operation of the clutch solenoid 160, as described in more detail hereinafter.

The cycle control mechanism also includes means for sensing the completion of a machine cycle which, by way of example, comprises a cam 350 (FIGS. 3 and 6) fixed to shaft 142 and having a cam lobe 352 which via a cam follower roller 354 actuates a microswitch 356 which is mounted in fixed position adjacent the cam. Cam 350 is oriented relative to cam slide unit 110 such that lobe 352 causes an output signal to be generated by switch 356 when shaft 142 has rotated to the point where needles 112 have been retracted through stripper plate 122 and are completing their upstroke. Switch 356 is connected by suitable electrical circuitry described hereinafter to cause solenoids 320 of the stop mechanisms to retract stop members 303 out of engagement with tray fingers 26 at the completion of an injection cycle.

OPERATION

To operate the above described egg injection machine, the conveyor drive is energized so that chains 50 and 52 run continuously at the same speed and in the direction of the arrows in FIG. 4, and motor 126 is likewise energized to run continuously. The injection machine is thereby conditioned to cycle "on demand," that is, its cycle of operation is initiated by the arrival of a tray 10 of eggs at the work station beneath the needles 112. In the absence of a tray at the work station, solenoids 320 of the stop mechanisms 300 and 302 are energized to hold the stop members 303 in their release position clear of the path of travel of tray 10 on the conveyor, whereas sensor 334 is disposed in the tray sensing position of FIGS. 4 and 9.

As a tray 10 full of eggs to be inoculated approaches the work station of the machine, the leading finger 26a at the side of tray 10 adjacent sensor 334 strikes the tapered leading edge 352 of arm 338, cams it outwardly, and holds it outwardly as finger 26a slides along the outer side edge of arm 338 until finger 26a has passed by arm 338, whereupon arm 338 is released so that it drops into the space between fingers 26a and 26b due to the bias of spring 342 acting on sensor 334. This out and back movement of sensor 334 actuates switch finger 350 through a simliar movement, and switch 346 during such actuation completes an energizing circuit to a suitable control device as described hereinafter, this energization circuit being again opened in response to finger 350 returning to its de-actuated position as sensor 334 drops back to its FIG. 9 position. The aforementioned control device may be a ratchet relay, stepping relay or equivalent electronic device well known in the art and therefore not shown herein. The stepping relay is suitably connected between switch 346 and stop mechanisms 300, 302 and clutch solenoid 160 so that, in response to termination of this first pulse or energizing signal from sensing mechanism 331, the output from the relay deenergizes solenoids 320 of stop mechanisms 300 and 302, thereby causing stops 303 to drop into tray blocking position when the advancing lead fingers 26a are still spaced about the distance between a pair of adjacent side fingers 26 from stops 303.

The second tray finger 26b now strikes sensing arm 338, again camming it out of the way until finger 26b has passed the same, whereupon arm 338 drops into the space between fingers 26b and 26c. This causes switch 346 to generate a second pulse or energizing signal to the termination of which the aforementioned stepping relay responds by generating a momentary second output signal, as by suitably connecting the usual self-interrupting contacts of the relay in parallel with solenoid 160, to thereby momentarily actuate solenoid 160 to trip pawl 152, thereby initiating a single revolution of shaft 142. A split second after arm 338 drops off finger 26b, fingers 26a strike the leading edges 328 of stop arms 304, thereby halting forward movement of tray 10 and locating the same in a predetermined position wherein the first and second transverse rows of eggs 38 are aligned beneath the raised needles 112 for simultaneous pentration by the needles of rows 114 and 113 respectively. Since chains 50 and 52 continue to run, they now slide along the smooth underside of tray 10 and exert a frictional force on tray 10 which urges the same against stops 303, thereby fixturing the tray for the injection operation.

Rotation of shaft 142 through a single revolution causes cam unit 110 to vertically reciprocate needles 112, initiating first a downstroke of the needles wherein their hollow piercing ends 120 are lowered from their raised position of FIGS. 1 and 2, pass through holes 124 in plate 122, pierce the crowns of the upper ends of the egg shells and then penetrate into eggs 38 to a depth of about ¾", whereupon cam unit 110 causes a pause in the needle travel at the bottom of the stroke. At this point cam 290 actuates clutch 256 to thereby cause pumps 200 and 202 to pump a metered quantity of liquid via each of the needles into the associated egg to inoculate the same with influenza seed virus. At the completion of the pumping stroke, cam unit 110 initiates the upstroke of the needles wherein ends 120 are retracted from the eggs and through plate 122 back up to their raised position shown in FIGS. 1 and 2. When the needles have almost reached their raised position, cam 350 actuates switch 356. Switch 356 is connected through suitable electrical circuitry (not shown) to the aforementioned stepping relay which is adapted to respond to such actuation of switch 356 to return the relay to its initial or zero condition in which it is operative to energize solenoids 320 of stop mechanisms 300 and 302 to thereby retract stops 303 clear of fingers 26a.

When tray 10 is released by stops 303, it is again frictionally propelled by chain runs 50 and 52 in the direction of the arrows of FIGS. 2 and 4. Fingers 26c thus advance and strike sensor 334 to again pivot it back as finger 26c passes the same. When sensor arm 338 drops behind finger 26c another "first" pulse is generated by sensing mechanism 332, again causing the stepping relay to deenergize solenoids 320, thereby allowing stops 303 to be swung by their springs back toward the tray fingers. However dimension A (FIG. 4) of arm 304 of stops 303 is only about ⅛" less than the spacing between adjacent side fingers 26 of the tray, and therefore arms 308 strike the outer sides of tray fingers 26b, rather than falling in ahead of these fingers, and hence the tray continues to be advanced by the conveyor. The fourth finger 26d then strikes sensor 334 and cams it out of the way, stop arms 304 at this time riding along the side faces of second fingers 26b. Due to the tapered trailing edges 330, 330' of arms 304 and 304', the same start to drop into the space between fingers 26b and 26c prior to the fourth finger 26d clearing sensor arm 338. When finger 26d clears arm 338, it drops into the space between fingers 26d and 26e, thereby generating a "second" pulse which, as described previously, again causes the stepping relay to energize clutch solenoid 160 to initiate a second cycle of the machine. Due to the pause produced by cams 162 and 164 at the upper end of the needle stroke, fingers 26c strike stops 303 and thereby register the middle two transverse rows of eggs in the tray with the two rows of needles slightly before or simultaneously with the initiation of the downstroke of needles.

After the middle two rows of eggs have been inoculated in the same manner as the first two rows of eggs by the machine cycling a second time, stops 303 are retracted at the completion of the second cycle, once more releasing tray 10 so that the same is moved forward by the conveyor. The fifth and sixth tray fingers 26e and 26f then are operable to cause sensing mechanism 332 to again generate "first" and "second" pulses. The first pulse causes stops 303 to drop against the sides of the fourth fingers 26d and, after these fingers have passed, to block fingers 26e and thereby position tray 10 for injection of the fifth and sixth transverse rows of eggs therein. The second pulse initiates the third machine cycle.

Upon completion of the third injection cycle switch 356 is actuated by cam 290, thereby resetting the control mechanism to zero and retracting stops 303. Since sensor 334 is now behind the last finger 26f, stops 303 will remain retracted and hence the last two sets of side fingers 26e and 26f are free to advance past stops 303 and hence the conveyor propels the fully injected tray out of the work station. The machine is now once again in its "ready" position and will perform the same sequence of operations as described above on the next successive tray of eggs whenever the same is delivered to the work station by the conveyor. Thus there is no need to synchronize the operation of the machine with the conveyor, and therefore loaded trays of eggs can be permitted to accumulate on the conveyor behind the tray being operated on by the machine, or can lag far behind, thereby lending a high degree of flexibility to production line manufacture of influenza vaccine.

From the foregoing, it will be evident that the above described conveying, sensing and fixturing structure of the present invention provides a machine operable through a cycle of motions to effect a given operation on an object such as an egg or the like supported on tray 10 in a predetermined position relative to the outer periphery of the tray. The present invention thus includes the concept of conveyor means 50–56 movable along a horizontal path of travel through a work station of the machine and adapted to engage the underside of tray 10 to support and frictionally propel the tray along said path of travel. The machine or apparatus also includes means for driving the conveyor continuously. At a predetermined position at the work station a stop 303 is movable between a first position blocking the patch of travel of tray 10 and a second position disposed clear of the path of travel of the tray. A sensor 334 is also located on the machine at the work station and is actuated by tray 10 being moved past the sensor by the conveyor. The sensor 334 is operably connected to the stop 303 to cause the stop to move to said first or blocking position in response to actuation of the sensor by the tray when the tray has almost reached the predetermined position along its path of travel at the work station.

Sensor 334 and its associated mechanism is also operably connected to the machine to initiate the cycle of motions of the machine in response to actuation of the sensor by the tray when the tray has substantially reached engagement with the stop. Hence the machine performs its operation on the tray-supported object, such as inoculation of the egg, while the tray is held frictionally against stop 303 by the frictional force exerted on the tray by the continuously moving conveyor 50–52. The machine also includes release means 350, 352, 354, 356, 320 driven in synchronism with the machine and operable near the end of the cycle of motions of the machine in performing the aforementioned operation to cause stop 303 to move from its blocking to its unblocking position to thereby release tray 10 upon completion of the operation of the machine, whereupon tray 10 is frictionally propelled by the conveyor means 50 and 52 out of the work station of the machine.

I claim:

1. A machine for injecting a liquid into eggs including in combination a hollow needle having a penetrating end adapted to pierce the unpierced shell of an egg, means supporting said needle for vertical movement with its axis vertical and said end pointing downwardly, drive means for moving said needle supporting means vertically between raised and lowered positions, means for transporting the egg horizontally to a work station and for supporting the egg stationarily at the work station large end up in registry with the path of travel of said needle and with the upper surface of the large end of the eggshell between said raised and lowered positions, means for supplying liquid to said needle including a pump, means for actuating said pump to pump a given quantity of liquid to said needle when the penetrating end of the needle is within the egg, and means for stripping the egg from the needle should the egg cling thereto when the needle is being withdrawn from the egg.

2. The machine as set forth in claim 1 further including means for synchronizing said pump actuating means with said drive means such that said pump is actuated when said needle is in the vicinity of said lowered position thereof.

3. The machine set forth in claim 2 wherein said drive means is operable to propel said needle on the downstroke between said raised and lowered positions such that said penetrating end pierces the egg shell with a minimum velocity of about eight-tenths of a foot per second, then decelerates at it travels to said lowered position and then pauses at said lowered position, said synchronizing means being operable to actuate said pump during said pause of said needle at said lowered position.

4. The machine set forth in claim 1 wherein said means for supporting the egg comprises a conveyor extending generally horizontally below said needle support in a direction generally perpendicular to the path of travel of said needle, and an egg support disposed on said conveyor for movement thereby and having a compartment adapted to receive and support the egg therein oriented with its large end upright and spaced beneath the raised position of said needle, said egg support having locating structure disposed in a predetermined position relative to said compartment, means for stopping travel of said egg support at a predetermined point wherein said egg compartment is positioned in registry with the path of travel of the needle and sensing means positioned at a fixed location relative to the path of travel of said egg support and actuatable by travel of said locating structure relative thereto to cause said stop means to stop travel of said egg support at said predetermined point.

5. The machine set forth in claim 4 wherein said conveyor comprises continuously driven endless flexible means movable along the path of movement of said egg support, said egg support comprises a tray having a smooth undersurface adapted to rest on said flexible means whereby said tray is frictionally propelled by said flexible means but is slidable thereon when forward movement of the tray is prevented by said stop means and said stop means includes finger means movable from a position clear of the path of travel of said tray into blocking relation to said tray to stop travel of said tray at said predetermined point in response to said actuation of said sensing means by said locating structure, said conveyor frictionally urging said tray against said finger means of said stop means to thereby fixture said tray for an injection cycle of said machine, said sensing means being operably connected to said drive means for initiating an injection stroke of said machine in response to actuation of said sensing means by said locating structure when said tray is frictionally fixtured at said predetermined point.

6. The machine as set forth in claim 5 further including a pair of fixed guide rails disposed one adjacent each outer side edge of said endless flexible means and projecting above the upper surface thereof, said tray having a pair of parallel opposite sides received closely adjacent the associated guide rail so that said tray is propelled on said conveyor with said sides thereof parallel to the direction of travel of the conveyor.

7. A machine as set forth in claim 1 wherein said pump comprises a conduit adapted to connect a source of supply of the liquid to said needle for supplying the liquid to said needle, said conduit having a squeezable tubular portion disposed adjacent said pump, comprising a movable roller support and a plurality of rollers supported in spaced relation for individual rotation on said roller support and being bodily carried thereby for successively engaging said tubular portion for travel therealong between spaced points of engagement and of disengagement, means backing up said tubular portion on the side thereof opposite said rollers such that said tubular portion is squeezed between said rollers and said back-up means to propel the liquid along said tubular portion, each roller engaging the tube at said engagement point no later than the disengagement of the preceding roller from said tubular portion, and means for actuating said roller support to effect travel of an engaged roller along said tubular portion for a given distance sufficient to thereby pump said given quantity of the liquid to said needle.

8. The machine set forth in claim 1 wherein said needle supporting and drive means comprises a vertically disposed guideway, means including a needle carrier for supporting said needle thereon for movement therewith and supported for vertical movement by said guideway, cam follower means operably connected to said carrier for raising and lowering the same, a rotatable camshaft disposed perpendicular to the direction of travel of said carrier, cam means mounted on said camshaft and having a contoured surface engageable with said cam follower means such that rotation of said cam means effects a full cycle of vertical movement of said carrier between said raised and lowered positions of the needle, a clutch having its output end connected to said camshaft, rotary means connected to the input of said clutch and adapted to impart continuous rotary input motion to said clutch and means operable to cause said clutch to interengage the input and output ends thereof when said egg supporting means is registered such that the egg supported thereby is beneath the raised position of said needle for a period of time sufficient to rotate said cam means through said full cycle.

9. The machine as set forth in claim 8 including means for synchronizing the operation of said pump actuating means with said needle moving means comprising second cam means on said camshaft, a second cam follower actuated by said second cam means and means connected to said second cam follower and actuatable thereby to control said pump actuating means to effect pumping of said given quantity of the liquid when said needle is in said lowered position, said first cam means being operable to effect a pause of said needle at said lowered position at least coextensive with said pumping of the liquid.

10. A machine for injecting liquid simultaneously into a plurality of eggs comprising a conveyor, a tray supported on said conveyor for movement along a generally horizontal path and having a series of compartments adapted for individually receiving said eggs and supporting the same upright in a row extending transverse to the path of travel of the tray on said conveyor, means for sensing the position of said tray during movement thereof along the conveyor, stop means actuated by said sensing means for stopping movement of said tray without stopping movement of the conveyor when the tray reaches a predetermined position on the conveyor whereby said eggs are stationarily supported at said predetermined position, a plurality of conduits one for each of the egg compartments each having a hollow needle communicating therewith and adapted to pierce the shell of an egg, means for supporting said needles with their axes vertical and their penetrating ends pointing downwardly for vertical movement between raised and lowered positions respectively above and below the upper surface of the eggs on said tray, means for actuating said needles in a cycle of movement from the raised to the lowered position and back to the raised position when said tray is registered and located by said stop means at said predetermined position and liquid supply means connected to said conduits for supplying liquid to said needles between said raised and lowered positions.

11. The combination set forth in claim 10 wherein said needle moving means is adapted to effect vertical movement of said needles from the raised to the lowered position at a rate of acceleration such that the speed of said needles when contacting said upper surfaces of the eggs is at least approximately eight-tenths of a foot per second.

12. The combination set forth in claim 10 wherein said tray compartments are arranged to support the eggs in a plurality of parallel transverse rows spaced laterally from one another in the direction of travel of the tray on said conveyor, said tray having upright projections arranged in a row extending in the direction of tray travel and spaced along a side thereof each oriented in the same predetermined position relative to one of said egg rows, and said sensing means comprises a sensing arm projecting into the path of travel of said projections and adapted to be moved by engagement with said projections, and means responsive to such movement of said arm for controlling the operation of said stop means and said needle actuating means.

13. The combination set forth in claim 12 wherein said stop means comprises a blocking arm movable into the path of travel of said projections to a blocking position relative to said projections and adapted to project into the space between successively adjacent projections, said sensing means being operably connected to said stop means to cause movement of said blocking arm to said blocking position, and means operably connected to said stop means and responsive to completion of the needle movement cycle to cause said blocking arm to move out of the path of travel of said projections to release said tray.

14. In a machine operable through a cycle of motions to effect a given operation on an object, the combination comprising a carrier adapted to support the object on said carrier in a predetermined position thereon, said carrier having a series of projections located thereon at given intervals therealong in the direction of travel of the carrier, conveyor means movable along a horizontal path of travel through a work station of said machine and adapted to engage the underside of said carrier to support and frictionally propel said carrier along said path of travel, means for driving said conveyor means continuously, stop means supported on said machine in a predetermined position at the work station thereof including a stop juxtaposed to the path of travel of said projections and movable between a first position blocking the path of travel of said projections and a second position disposed clear of the path of travel of said projections, sensing means located on the machine at the work station including a finger juxtaposed to the path of travel of said projections and having one end thereof projecting into the path of travel of said projections and adapted to be moved by engagement of each of said projections therewith as each of said projections move past said finger to thereby actuate said sensing means, said sensing means being operably connected to said stop means such that actcation of said finger by at least one of said projections actuates said stop means to move said stop from said second to first position thereof when a predetermined one of said projections is approaching said stop, said sensing means also being operably connected to said machine to initiate the cycle of motions of said machine in response to actuation of said finger by another one of said projections when said predetermined one of said projections has substantially reached engagement with said stop so that said machine performs said given operation on the object while said carrier is held frictionally against said stop by the frictional force exerted on said carrier by the continuously moving conveyor means, and release means including means driven in synchronism with the said machine and operable near the end of the cycle of motions of the machine in performing said operation to cause said stop means to move said stop from said first position to said second position to thereby release said carrier upon completion of the operation of said machine whereupon said carrier is frictionally propelled by said conveyor means further along said path of travel relative to the work station of the machine.

15. The combination set forth in claim 14 wherein said carrier comprises a tray having compartments arranged to support the objects in a plurality of parallel transverse rows spaced laterally from one another in the direction of travel of said tray on said conveyor, said projections comprising upright projections arranged in a row extending in the direction of tray travel and spaced along a side thereof each oriented in the same predetermined position relative to one of said rows, said stop being located to project into the space between successively adjacent projections.

16. A machine for injecting a liquid into eggs including in combination a hollow needle having a penetrating end adapted to pierce the unpierced shell of an egg, means supporting said needle for vertical movement with its axis vertical and said end pointing downwardly, drive means for moving said needle supporting means vertically between raised and lowered positions, means for supporting the egg stationarily at a work station large end up in registry with the path of travel of said needle and with the upper surface of the large end of the eggshell between said raised and lowered positions, means for supplying liquid to said needle including a pump and means for actuating said pump to pump a given quantity of liquid to said needle when the penetrating end of the needle is within the egg, said drive means being operable to propel said needle on its downstroke between said raised and lowered positions thereof such that said penetrating end pierces the eggshell with a velocity of at least about eight-tenths of a foot per second.

17. A machine for injecting a liquid into eggs including in combination a hollow needle having a penetrating end adapted to pierce the unpierced shell of an egg, means supporting said needle for vertical movement with its axis vertical and said end pointing downwardly, drive means for moving said needle supporting means vertically between raised and lowered positions, means for transporting the egg horizontally to a work station and for supporting the egg stationarily at the work station large end up in registry with the path of travel of said needle and with the upper surface of the large end of the eggshell between said raised and lowered positions, means for supplying liquid to said needle including a pump and means for actuating said pump to pump a given quantity of liquid to said needle when the penetrating end of the needle is within the egg, said means for transporting and supporting the egg including a conveyor extending generally horizontally below said needle support in a direction generally perpendicular to the path of travel of said needle, and an egg support disposed on said conveyor for movement thereby and having a compartment adapted to receive and support the egg therein oriented with its large end upright and spaced beneath the raised position of said needle, said egg support having locating structure disposed in a predetermined position relative to said compartment, means for stopping travel of said egg support at a predetermined point wherein said egg compartment is positioned in registry with the path of travel of the needle and sensing means positioned at a fixed location relative to the path of travel of said egg support and actuatable by travel of said locating structure relative thereto to cause said stop means to stop travel of said egg support at said predetermined point, said conveyor comprising continuously driven endless flexible means movable along the path of movement of said egg support, said egg support comprising a tray having a smooth undersurface adapted to rest on said flexible means whereby said tray is frictionally propelled by said flexible means but is slidable thereon when forward movement of the tray is prevented by said stop means, said stop means including finger means movable from a position clear of the path of travel of said tray into blocking relation to said tray to stop travel of said tray at said predetermined point in response to said actuation of said sensing means by said locating structure, said conveyor frictionally urging said tray against said finger means of said stop means to thereby fixture said tray for an injection cycle of said machine, said sensing means being operably connected to said drive means for initiating an injection stroke of said machine in response to actuation of said sensing means by said locating structure when said tray is frictionally fixtured at said predetermined point.

18. A machine for injecting a liquid into eggs including in combination a hollow needle having a penetrating end adapted to pierce the unpierced shell of an egg, means supporting said needle for vertical movement with its axis vertical and said end pointing downwardly, drive means for moving said needle supporting means vertically between raised and lowered positions, means for supporting the egg stationarily at a work station large end up in registry with the path of travel of said needle and with the upper surface of the large end of the eggshell between said raised and lowered positions, means for supplying liquid to said pump to pump a given quantity of liquid to said needle when the penetrating end of the needle is within the egg, said pump comprising a conduit adapted to connect a source of supply of the liquid to said needle for supplying the liquid to said needle, said conduit having a squeezable tubular portion disposed adjacent said pump, said pump comprising a movable roller support and a plurality of rollers supported in spaced relation for individual rotation on said roller support and being bodily carried thereby for successively engaging said tubular portion for travel therealong between spaced points of engagement and of disengagement, means backing up said tubular portion on the side thereof opposite said rollers such that said tubular portion is squeezed between said rollers and said back-up means to propel the liquid along said tubular portion, each roller engaging the tube at said engagement point no later than the disengagement of the preceding roller from said tubular portion, and means for actuating said roller support to effect travel of an engaged roller along said tubular portion for a given distance sufficient to thereby pump said given quantity of the liquid to said needle.

References Cited

UNITED STATES PATENTS

| | | | |
|---|---|---|---|
| 2,537,673 | 1/1951 | James | 195—127 |
| 2,551,605 | 5/1951 | James et al. | 195—127 |
| 2,762,365 | 9/1956 | Wagner et al. | 195—120 |
| 2,856,892 | 10/1958 | Winfree et al. | 118—8 |
| 3,078,630 | 2/1963 | Mayer et al. | 53—68 |
| 3,147,783 | 9/1964 | Noltes | 146—2 |
| 3,203,435 | 8/1965 | Kurtz | 153—3.13 |
| 3,377,989 | 4/1968 | Sanphage et al. | 195—127 |
| 3,092,237 | 6/1963 | Miller | 198—19 |

ALVIN E. TANENHOLTZ, Primary Examiner

U.S. Cl. X.R.

195—1.1; 222—14; 146—2; 198—19